(12) United States Patent
Choi et al.

(10) Patent No.: US 10,193,189 B2
(45) Date of Patent: Jan. 29, 2019

(54) BATTERY CELL

(71) Applicant: HYUNDAI MOTOR COMPANY, Seoul (KR)

(72) Inventors: Sung Min Choi, Gyeongju-si (KR); Ik Kyu Kim, Gwangmyeong-si (KR); Seung Ho Ahn, Hanam-si (KR); Hong Seok Min, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 93 days.

(21) Appl. No.: 15/363,953

(22) Filed: Nov. 29, 2016

(65) Prior Publication Data

US 2018/0090793 A1 Mar. 29, 2018

(30) Foreign Application Priority Data

Sep. 27, 2016 (KR) .......... 10-2016-0123868

(51) Int. Cl.
| *H01M 2/02* | (2006.01) |
| *H01M 2/34* | (2006.01) |
| *H01M 10/02* | (2006.01) |
| *H01M 10/42* | (2006.01) |

(52) U.S. Cl.
CPC ....... *H01M 10/4235* (2013.01); *H01M 2/021* (2013.01); *H01M 2/0237* (2013.01); *H01M 2/345* (2013.01); *H01M 10/02* (2013.01); *H01M 2200/10* (2013.01); *H01M 2200/103* (2013.01); *H01M 2200/20* (2013.01);
(Continued)

(58) Field of Classification Search
CPC .......... H01M 10/4235; H01M 2/345
See application file for complete search history.

(56) References Cited

U.S. PATENT DOCUMENTS

| 2001/0038938 A1* | 11/2001 | Takahashi | ........... H01G 2/14 429/53 |
| 2005/0014036 A1* | 1/2005 | Kim | ............ H01M 2/021 429/7 |

(Continued)

FOREIGN PATENT DOCUMENTS

| KR | 10-1192077 B1 | 10/2012 |
| KR | 10-2016-0049889 A | 5/2016 |
| KR | 10-2016-0060510 A | 5/2016 |

OTHER PUBLICATIONS

Machine Translation of KR 10-2011-0048470 (May 30, 2018) (Year: 2018).*

(Continued)

*Primary Examiner* — Matthew J Merkling
(74) *Attorney, Agent, or Firm* — Knobbe Martens Olson & Bear LLP

(57) ABSTRACT

The present disclosure relates to a battery cell. The battery cell includes: an electrode assembly; a pouch which wraps around the electrode assembly; an electrode tab extended from the electrode assembly; a lead tab attached to the electrode tab; and a current interrupt device which is configured to block reconnection of the lead tab and the electrode tab when the pouch is shrunk to return to an original position after being expanded, while blocking current flow by separating the lead tab and the electrode tab through the expansion of the pouch, when abnormal situation of battery cell occurs.

10 Claims, 5 Drawing Sheets

(52) U.S. Cl.
CPC .... *H01M 2220/10* (2013.01); *H01M 2220/20* (2013.01); *H01M 2220/30* (2013.01)

(56) References Cited

U.S. PATENT DOCUMENTS

| | | | |
|---|---|---|---|
| 2010/0233519 A1* | 9/2010 | Cheon | H01M 2/34 429/56 |
| 2012/0040235 A1* | 2/2012 | Cho | H01M 2/0207 429/156 |
| 2015/0079429 A1* | 3/2015 | Han | H01M 2/345 429/61 |
| 2016/0028068 A1* | 1/2016 | Yang | H01M 2/1235 429/61 |
| 2016/0149201 A1 | 5/2016 | Min et al. | |
| 2017/0110711 A1* | 4/2017 | Ahn | H01M 2/345 |
| 2017/0117515 A1* | 4/2017 | Ahn | H01M 2/345 |
| 2017/0237060 A1* | 8/2017 | Inoue | H01M 2/06 429/62 |

OTHER PUBLICATIONS

Office Action in corresponding Korean Patent Application No. 10-2016-0123868—6 pages, (dated Jan. 6, 2018).

* cited by examiner

BATTERY CELL

CROSS-REFERENCE TO RELATED APPLICATION

This application claims the benefit of priority to Korean Patent Application No. 10-2016-0123868, filed on Sep. 27, 2016 in the Korean Intellectual Property Office, the disclosure of which is incorporated herein in its entirety by reference.

BACKGROUND

Field

The present disclosure relates to a battery cell having a current interrupt mechanism.

Description of the Related Art

As is well known, a battery cell for supplying electric energy stores and releases energy while being charged and discharged.

The over-discharge of the battery cell reduces the life, the durability, etc. of the battery cell due to the characteristic of energy consumption, and the over-charge of the battery cell may lead to a safety hazard due to the characteristic that energy is accumulated.

SUMMARY

The present disclosure relates to a battery cell capable of detecting an abnormal pressure change in the battery cell and inducing a disconnection between an electrode assembly and a lead tab so as to block an internal current before explosion or ignition, and then, preventing the lead tab from being connected again to the electrode assembly even if a pouch of thin plate material is shrunk to return to an original position.

In accordance with an aspect of the present disclosure, a battery cell includes: an electrode assembly; a pouch which wraps around the electrode assembly; an electrode tab extended from the electrode assembly; a lead tab attached to the electrode tab; and a current interrupt device which is configured to block reconnection of the lead tab and the electrode tab when the pouch is shrunk to return to an original position after being expanded, while blocking current flow by separating the lead tab and the electrode tab through the expansion of the pouch, when abnormal situation of battery cell occurs.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EMBODIMENTS

Embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

If the over-charge phenomenon occurs in the interior of the battery cell, the stoma of separator located between the positive electrode material and the negative electrode material may be closed due to the gas generation, the temperature rise, etc. in the interior of the battery cell, such that the swelling phenomenon of the battery cells may be generated and explosions may occur.

Therefore, the battery cell may be provided with a safety circuit against over-charge, so that it is possible to prevent a further charging upon charging before the battery cell proceeds to the state of ignition or explosion, thereby securing a fail safety for the safety of customer.

Meanwhile, a pouch type battery cell may include an electrode assembly, a pouch of thin plate shape which wraps around the electrode assembly, and a lead tab connected to the electrode assembly. The lead tab may be projected outside of the pouch.

In addition, a current interrupt device (CID), which is a kind of safety circuit, may be installed in the pouch type battery cell, and the current interrupt device may induce the lead tab to be disconnected from the electrode assembly if the pouch is expanded when an over-charge occurs, thereby blocking a current flow.

However, as the pouch is formed of a thin plate shape, when the over-charge of the battery cell occurs, the expansion of the pouch may not be continuously maintained but the pouch may be shrunk, and the disconnected lead tab may be coupled (connected) again to the electrode assembly as the pouch is shrunk.

Thus, in a typical pouch type battery cell, the disconnected lead tab may be coupled (connected) again to the electrode assembly as the pouch of thin plate shape is shrunk after being expanded and the battery current may flow again, such that the charging may be continuously performed. Thus, the typical pouch type battery cell may not completely block the current of the battery cell when over-charge occurs.

Figure 1:
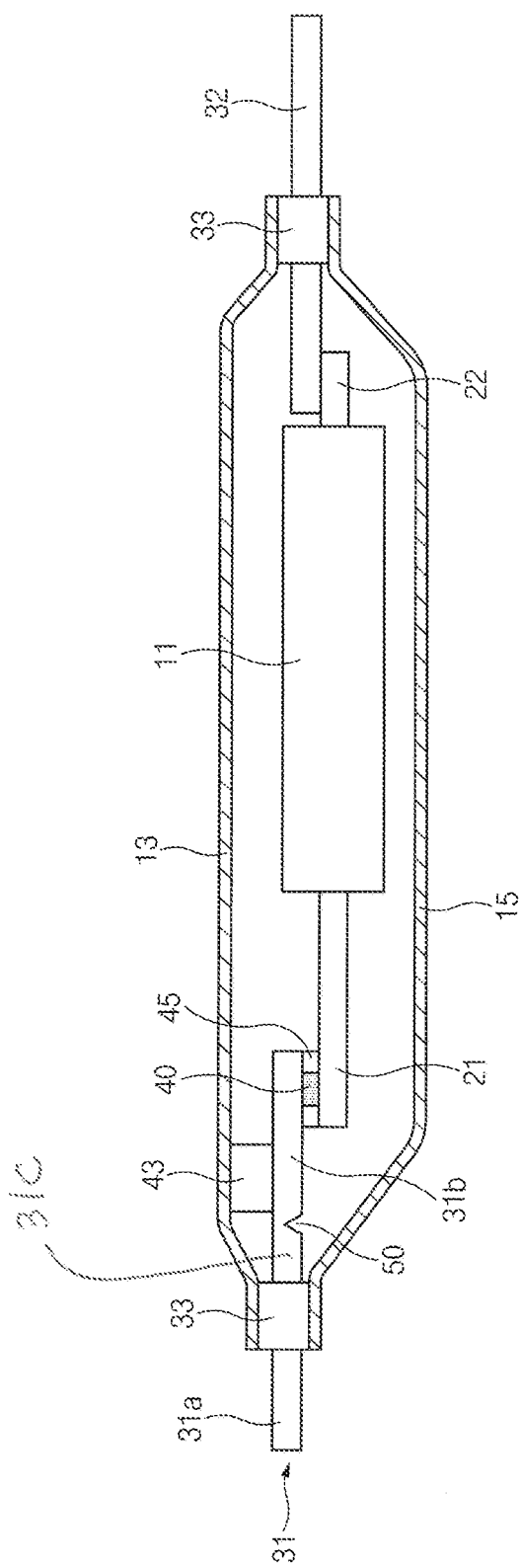
FIG. 1 is a cross-sectional view illustrating a battery cell according to an embodiment of the present disclosure.
Figure 2:
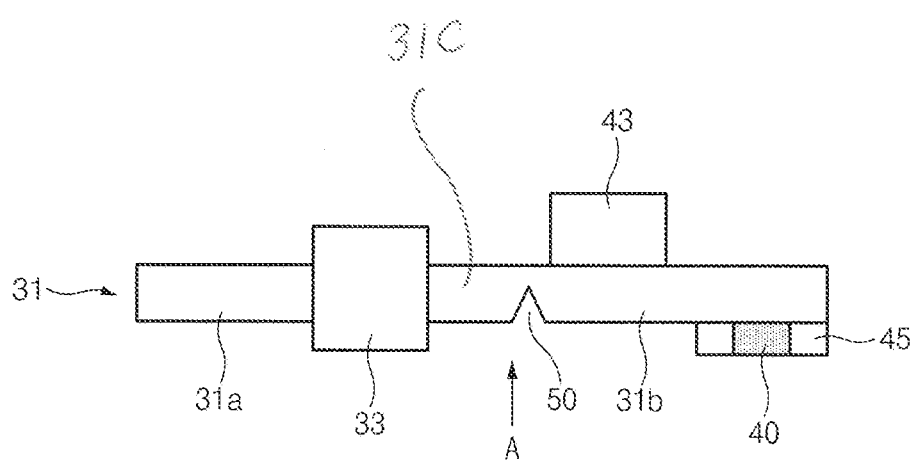
FIG. 2 is a diagram illustrating a first lead tab of a battery cell according to an embodiment of the present disclosure.
Figure 3:
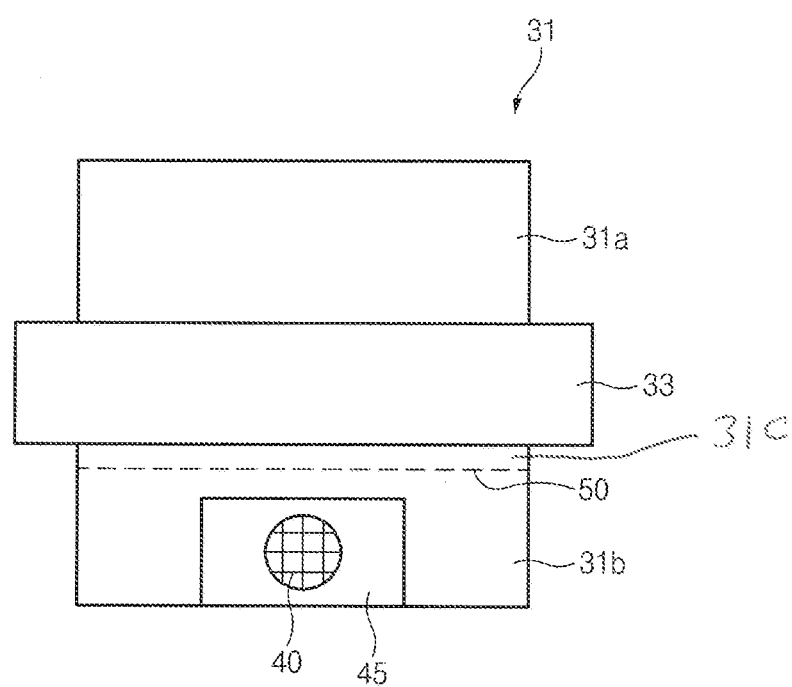
FIG. 3 is a diagram viewed in the direction of arrow A of FIG. 2.

As shown in FIG. 1, a battery cell according to an embodiment of the present disclosure may include an electrode assembly 11, a pouch including pouch walls 13, 15 which wraps around the electrode assembly 11, an electrode tab 21, 22 extending from the electrode assembly 11, and a lead tab 31, 32 attached to the electrode tab 21, 22.

The electrode assembly 11 may include a separator, and positive and negative electrode plates laminated on both sides of the separator. According to one embodiment, the electrode assembly 11 may be formed of a jelly-roll electrode assembly.

The pouch walls 13, 15 may be configured as a thin plate shape to sealingly accommodate the electrode assembly 11 and electrolyte, etc.

According to one embodiment, the pouch may include a first pouch wall 13 which covers one side of the electrode assembly 11 and a second pouch wall 15 which covers the other side of the electrode assembly 11. In addition, the edge of the first pouch wall 13 and the edge of the second pouch wall 15 may be sealingly bonded, and this allows to protect the electrode assembly 11 safely and prevent the leakage of electrolyte solution, etc.

Meanwhile, each pouch wall 13, 15 may have a multilayer structure in order to secure excellent heat sealing properties, rigidity to maintain shape and protect the electrode assembly 11 without any unusual pressure increase in the pouch, pliability which allows its deformation when the pouch is inflated due to pressure increase within the pouch, and insulating properties. For example, each pouch wall 13, 15 may have a multi-layer structure including a first layer which is positioned in the innermost side and which faces the electrode assembly 11, a second layer which is positioned in the outermost side and which is exposed to the external environment, and a third layer which is interposed between the first layer and the second layer. In this case, for example, the first layer may be formed of a material, such as polypropylene (PP), which has corrosion resistance for electrolyte solution, insulating properties, and heat sealing properties, the second layer may be formed of a material, such as polyethylene terephthalate (PET), which has rigidity to maintain shape and insulating properties, and the third layer may be formed of a metal material such as aluminum (Al).

The electrode tab 21, 22 may be extended outwardly from the electrode assembly 11 and formed to be flat.

The electrode tab 21, 22 may include a first electrode tab 21 and a second electrode tab 22 which are connected separately to a positive electrode plate and a negative electrode plate of the electrode assembly 11.

According to one example, the first electrode tab 21 may be extended integrally from the positive electrode plate of the electrode assembly 11 to configure a positive electrode tab, and the second electrode tab 22 may be extended integrally from the negative electrode plate of the electrode assembly 11 to configure a negative electrode tab.

According to another example, the first electrode tab 21 may be extended integrally from the negative electrode plate of the electrode assembly 11 to configure a negative electrode tab, and the second electrode tab 22 may be extended integrally from the positive electrode plate of the electrode assembly 11 to configure a positive electrode tab.

The embodiment of FIG. 1 illustrates a structure in which the first electrode tab 21 and 22 is extended symmetrically from both ends of the electrode assembly 11, but the present disclosure is not limited thereto and may be formed of various structures according to specifications of the battery cell such as a structure extended in the same direction from one end of the electrode assembly 11.

The lead tab 31, 32 may be combined by various methods such as welding or soldering to be electrically connected to the electrode tab 21, 22.

The lead tab 31, 32 may include a first lead tab 31 which is attached to the first electrode tab 21 and a second lead tab 32 which is attached to the second electrode tab 22.

One or more sealing members 33, 34 may be integrally provided on the outer surface of each lead tab 31 and 32, and the end of a first pouch wall 13 and a second pouch wall 15 may be bonded to each sealing member 33, 34. Thus, the leak of electrolyte solution may be prevented reliably by blocking a gap between the pouch walls 13, 15 and the lead tab 31, 32.

Various embodiments of the present disclosure may include a current interrupt device which blocks the flow of current in the battery cell when abnormal situation (e.g., overcharge, etc.) of the battery cell occurs, and the current interrupt device may be provided to at least one of the lead tab 31 among the first lead tab 31 and the second lead tab 32. The current interrupt device may be configured to block the current of battery cell by using a force of gas, which is generated by the side reaction of electrolyte when abnormal situation of the battery cell occurs, that expands the pouch and deforms the pouch walls 13, 15.

The current interrupt device according to an embodiment of the present disclosure may be configured to block the reconnection of the lead tab and the electrode tab when the pouch is shrunk to return to its original position, while blocking the current flow by separating the lead tab and the electrode tab through the expansion of the pouch, when abnormal situation of the battery cell occurs.

The current interrupt device according to an embodiment of the present disclosure may include a fusing unit 40 which is provided integrally in at least one lead tab 31, a notch 50 which is provided in at least one lead tab 31, and an insulating layer 45 which wraps around the fusing unit 40.

The fusing unit 40 may be provided integrally in at least one lead tab 31, and the bottom surface of the fusing unit 40 may be attached to the electrode tab through welding, soldering, or the like. Thus, at least one lead tab and the electrode tab adjacent to the lead tab may be attached to be detachable by the fusing unit 40.

According to an embodiment of FIG. 1, the fusing unit 40 may be formed integrally on the bottom surface of a first lead tab 31. According to one example, the fusing unit 40 may be formed of a protrusion structure protruding from the bottom surface of the first lead tab 31. According to another example, the top surface of the fusing unit 40 may be attached to the bottom surface of the first lead tab 31 through welding, soldering, or the like.

In addition, the bottom surface of the fusing unit 40 may be attached to the top surface of the first electrode tab 21 through welding, soldering, or the like. Meanwhile, the bond strength of the top surface of the fusing unit 40 may be larger than the bond strength of the bottom surface of the fusing unit 40. Thus, the bottom surface of the fusing unit 40 may be easily separated from the top surface of the first electrode tab 21 due to the expansive force of the pouch and deformation of the walls 13, 15 when abnormal situation (e.g., overcharge, etc.) of the battery cell occurs. Accordingly, the current interrupt due to abnormal situation of the battery cell may be achieved effectively.

The fusing unit 40 may have a certain thickness t1, and the first lead tab 31 and the first electrode tab 21 may be spaced apart responding to the thickness t1 of the fusing unit 40.

According to one example, the fusing unit 40 may be formed of a bead or solder ball of metal material through which current can flow smoothly, and the first lead tab 31 and the first electrode tab 21 may be electrically connected via the fusing unit 40 as the bottom surface of the fusing unit 40 is attached to the top surface of the first electrode tab 21.

The fusing unit 40 may be formed of a cylinder type having a circular cross-section, and thus, the bottom surface of the fusing unit 40 is formed of a circular cross-section. Accordingly, the fusing unit 40 may be smoothly separated from the first electrode tab 21.

Figure 4:
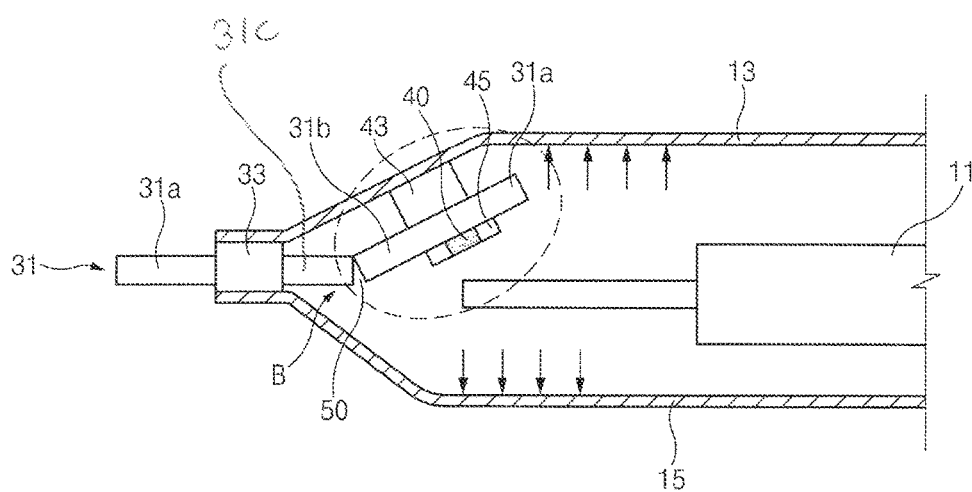
FIG. 4 is a diagram illustrating a state in which a lead tab and an electrode tab are separated as a pouch of battery cell expands according to an embodiment of the present disclosure.
Figure 5:
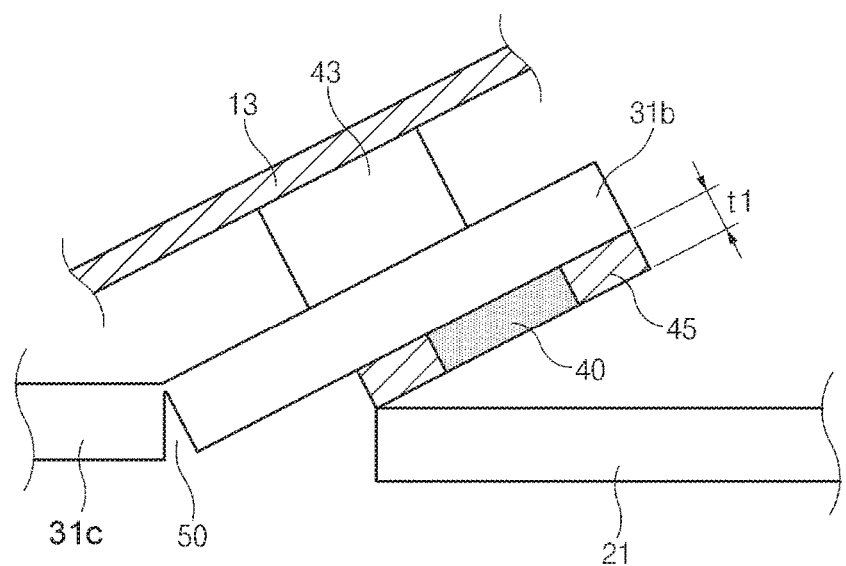
FIG. 5 is a diagram illustrating an enlarged view of arrow B portion of FIG. 4 when the pouch shrinks back after expansion.

According to an embodiment of FIG. 1, one side of the lead tab 31 may be locally cut away to form the notch 50. Thus, as shown in FIG. 4 and FIG. 5, when abnormal situation (overcharge, etc.) of the battery cell occurs, as the pouch expands or inflates, the first lead tab 31 may be bent based on the notch 50. Due to such a bending of the first lead tab 31, the first lead tab 31 and the first electrode tab 21 may be separated from each other, thereby blocking the current of the battery cell.

The first lead tab 31 may be divided into a first portion 31a and a second portion (distal portion) 31b based on the notch 50. The first portion includes a proximal portion 31c. The sealing member 33 may be disposed in the first portion 31a, and the first pouch wall 13 and the second pouch wall 15 may be joined to the sealing member 33. Accordingly, a neb of the first portion 31a may be exposed to the outside of the pouch walls 13, 15. The second portion 31b may be coupled to the first electrode tab 21 via the fusing unit 40.

The embodiment of the present disclosure may have a guide means for guiding the bending of the first lead tab 31 when the pouch walls 13, 15 deform and the pouch expands upon the occurrence of the abnormal situation of the battery cell. The guide means induces the bending of the first lead tab 31 based on the notch 50, so that the separation (disconnection) of the first lead tab 31 and the second electrode tab 21 may be effectively induced.

According to one embodiment, the guide means may include a connection member 43 for connecting the first lead tab 31 and the first pouch wall 13 adjacent to the first lead tab 31.

One side of the connection member 43 may join to the second portion 31b of the first lead tab 31, and the other side of the connection member 43 may join to the first pouch wall 13, so that the second portion 31b of the first lead tab 31 may be moved according to expansion or shrinkage of the pouch and the deformation of the first pouch wall 13.

The first notch 50 may be disposed in one side of the lead tab 31, and the connection member 43 may be disposed in the other side of the lead tab 31. That is, the notch 50 and the connection member 43 may be located in the opposite side to each other in the first lead tab 31, so that the bending of the first lead tab 31 due to the expansion of the pouch and the deformation of the first pouch wall 13 may be induced. In detail, when the pouch expands and the first pouch wall 13 is deformed, the first portion 31a of the first lead tab 31 may maintain level due to the self-weight of the first lead tab 31 and/or the self-weight of the sealing member 33 while the connection member 43 pulls the second portion 31b of the first lead tab 31. Accordingly, as shown in FIG. 4 and FIG. 5, the second portion 31b of the first lead tab 31 may be bent based on the notch 50. As described above, since the first lead tab 31 is bent, the fusing unit 40 of the first lead tab 31 may be very easily separated from the first electrode tab 21.

According to one example, the second portion 31b may have a shorter length than the length of the first portion 31a so as to accomplish the bending of the second portion 31b more smoothly.

Then, the connection member 43 may be spaced apart at regular intervals in the horizontal direction for the notch 50. In particular, it is preferable that the connection member 43 and the notch 50 are spaced apart at intervals which can induce the smooth bending of the first lead tab 31.

Meanwhile, the pouch walls 13, 15 may be more flexible compared to a prismatic battery as they are formed of a thin plate shape. Thus, when the battery cell is overcharged, the pouch may become swollen and then it may shrink, so that the pouch walls 13, 15 may deform back toward their original position although not exact. When the pouch walls 13, 15 deform toward their original position, the second portion 31b of the first lead tab 31 may move toward its original position. Accordingly, the fusing unit 40 of the first lead tab 31 may contact the first electrode tab 21. As the fusing unit 40 contacts the first electrode tab 21, the lead tab 31 and the electrode tab 21 may be electrically connected, and thus, the current flow of the battery cell may be resumed, which may cause ignition and can lead to explosion of the battery cell.

In embodiments, electrical contact between the fusing unit 40 and the first electrode tab 21 may be prevented as the pouch shrinks after being expanded.

According to an embodiment of the present disclosure, referring to FIG. 5, the insulating layer 45 surrounds the periphery of the fusing unit 40. With the insulating layer 45 surrounding the periphery of the fusing unit 40, even if the pouch shrinks back to its original shape after expansion, the fusing unit 40 may not contact the first electrode tab 21.

According to one embodiment, the insulating layer 45 around the fusing unit 40 may have about the same thickness as the thickness t1 of the fusing unit 40. Since the insulating layer 45 surrounds the outer surface of the fusing unit 40 totally when the fusing unit 40 is a cylinder type having a circular cross-section, it is possible to reliably prevent the fusing unit from being in contact with the first electrode tab 21 again regardless of the direction of the shrinkage of the first pouch.

Thus, according to various embodiments of the present disclosure, at least one lead tab may have the fusing unit 40 of a certain thickness t1, the fusing unit 40 of lead tab may be attached to the adjacent electrode tab, and the insulating layer 45 may be formed around the fusing unit 40. Thus, even if the pouch is expanded upon the overcharge of the battery cell is shrunk, the fusing unit 40 of the lead tab 31 may not directly be in contact with the first electrode tab 21 due to the insulating layer 45 formed around the fusing unit 40, so that it is possible to reliably block the possibility of the re-coupling (re-connection) of the lead tab 31 and the electrode tab 21.

In embodiments, referring to FIGS. 1-5, a battery device includes a pouch or housing. The pouch is at least in part made of pliable walls 13 and 15. The pouch encloses at least one electrode assembly 11, and a first electrode terminal 21 and a second electrode terminal 22 extending out of the electrode assembly 11 still within the pouch. An electrically conductive wiring (or lead tab) 31 air/liquid-tightly passes through the pouch via sealing member 33, 34. The electrically conductive wiring is made of a metal or includes a metallic material. Outside the pouch, the electrically conductive wiring 31 is connected to an electric component or circuitry of a system such as an automobile or a consumer electronic device. On the other hand, the conductive wiring 31 is connected to the first electrode terminal 21 within the pouch.

Inside the pouch, the conductive wiring 31 includes a proximal portion 31c, a distal portion (conductive tab) 31b and a notch 50 separating the proximal portion 31c from the distal portion 31b. The conductive tab 31b includes a first side facing the first electrode terminal 21 and a second side facing away from the first electrode terminal 21. The fusing unit 40 is an ohmic contact member attached to or protruding from the first side of the conductive tab 31b. In an embodiment, the fusing unit 40 has a contact surface that makes an ohmic contact with and is attached to a corresponding portion of the first electrode terminal 21. For this the conductive tab 31b and the first electrode terminal 21 are well aligned with each other as illustrated in FIG. 1.

An electric insulation (insulation layer) 45 is formed on the first side of the conductive tab 31 and surrounds the ohmic contact member 40 such that the electric insulation and the contact surface of the fusing member 40 are at about the same level. In one embodiment, the contact surface is round, and the electrical insulation radially extends from the outer edge of the round contact surface such that the radial extension of the insulation is at least by the radius of the contact surface although the insulation is not necessarily round.

A connection member or connector 43 physically connects the inner surface of the pouch wall 13 to the conductive wiring 31, particularly on the second side of the distal portion (conductive tab) 31b. In embodiments, the connector 43 has a body with a thickness that bridges between the pouch wall 13 and the conductive tab 31b when the battery is in its original shape. The connector body is substantially non-elastic, non-stretchable, or non-compressible in the thickness direction. In one embodiment, the body is in a block shape, although not limited thereto. The connector 43 has a first surface facing and attached to the inner surface of the pouch wall 13, and also has a second surface facing and attached to the second side of the conductive tab 31b. The first and second surfaces face away from each other and, in embodiments, are generally parallel to each other.

In embodiments, the notch 50 is configured to allow the conductive tab 31b to hingely bend relative to the proximal portion 31c. When gas pressure unwantedly increases inside the pouch, the pouch inflates, and its pliable wall 13 pulls the connector 43 and the conductive tab 31b as it inflates. When the pulling force caused by the pouch expansion reaches a critical point, the contact surface of the ohmic contact member 40 is detached from the first electrode terminal 21 and the conductive tab 31b hingely bends about the notch 50 relative to the proximal portion 31c as illustrated in FIG. 4.

Subsequently, when gas pressure inside the pouch decreases, the pouch deflates and its pliable walls 13, 15 may deform toward their original shapes although they may not return to their original shapes or positions. Further, as the pouch deflates, the connection member 43 and its attached conductive tab 31b may move back toward their original states although they may not return to their original shape or position. Given the nature of deflation and also the material property of the conductive tab 31b, the deflation of the pouch may not and probably does not apply enough force to hingely bend the conductive tab about the notch 50 to move the conductive tab 31b back to its original position relative to the notch 50, proximal portion 31c and the first electrode tab 21. Thus, as the deflation progresses and when it is complete, the conductive tab 31b may still be bent relative to the proximal portion 31c and the first electrode tab 21. Because the conductive tab 31b is bent relative to the first electrode tab 21 (see FIG. 5), even if the deflation makes the conductive tab 31b come close to the first electrode tab 21, the ohmic contact surface of the fusion unit 40 would be slanted relative to the corresponding surface of the first electrode tab 21 and rather insulation 45 would first contact the corresponding surface of the first electrode tab 21.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A battery cell comprising:
an electrode assembly;
a pouch which wraps around the electrode assembly;
an electrode tab extending from the electrode assembly;
a lead tab attached to the electrode tab; and
a current interrupt device comprising a fusing unit and an insulating layer wrapping around the fusing unit,
wherein the fusing unit comprises a top surface and a bottom surface, wherein the top surface of the fusing unit is attached to a bottom surface of the lead tab, and the bottom surface of the fusing unit is attached to a top surface of the electrode tab, wherein the top surface of the fusing unit has a bond strength greater than that of the bottom surface of the fusing unit.

2. The battery cell of claim 1, wherein the electrode tab comprises a first electrode tab and a second electrode tab, the lead tab comprises a first lead tab connected to the second electrode tab and a second lead tab attached to the second electrode tab, and the current interrupt device is provided in at least one lead tab among the first lead tab and the second lead tab.

3. The battery cell of claim 1, wherein the current interrupt device comprises a notch which is provided in the lead tab,
wherein the fusing unit is attached to the electrode tab detachably.

4. The battery cell of claim 3, wherein the fusing unit is configured to be separated from the electrode tab due to an expansion of the pouch when an abnormal situation occurs in the battery cell.

5. The battery cell of claim 3, wherein the notch is formed by being cut away locally in one side of the lead tab, and the lead tab is bent based on the notch when an abnormal situation occurs in the battery cell.

6. The battery cell of claim 5, further comprising a guide means to induce bending of the lead tab when the pouch is expanded when the abnormal situation occurs in the battery cell.

7. The battery cell of claim 6, wherein the guide means comprises a connection member to connect the lead tab and the pouch adjacent to the lead tab.

8. The battery cell of claim 7, wherein the lead tab is divided into a first portion and a second portion by the notch, the first portion is installed to protrude to the outside of the pouch, and the second portion is connected to the electrode tab through the fusing unit.

9. The battery cell of claim 8, wherein one surface of the connection member is joined to the second portion of the lead tab, and the other surface of the connection member is joined to the adjacent pouch.

10. The battery cell of claim 9, wherein the notch and the connection member are disposed opposite to each other in the lead tab.

\* \* \* \* \*